Aug. 27, 1935.  S. J. NORDSTROM  2,012,578
VALVE
Filed June 8, 1931  2 Sheets-Sheet 1
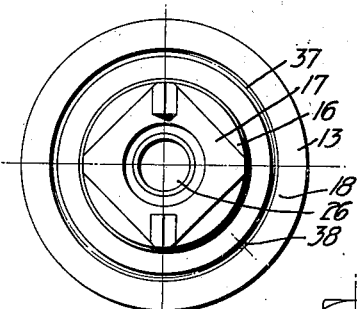
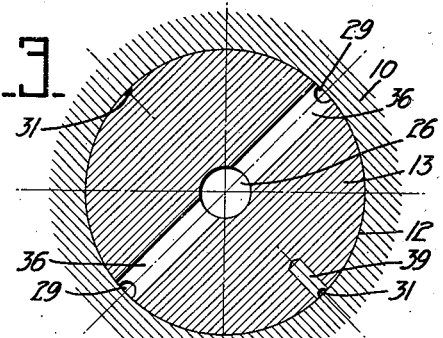
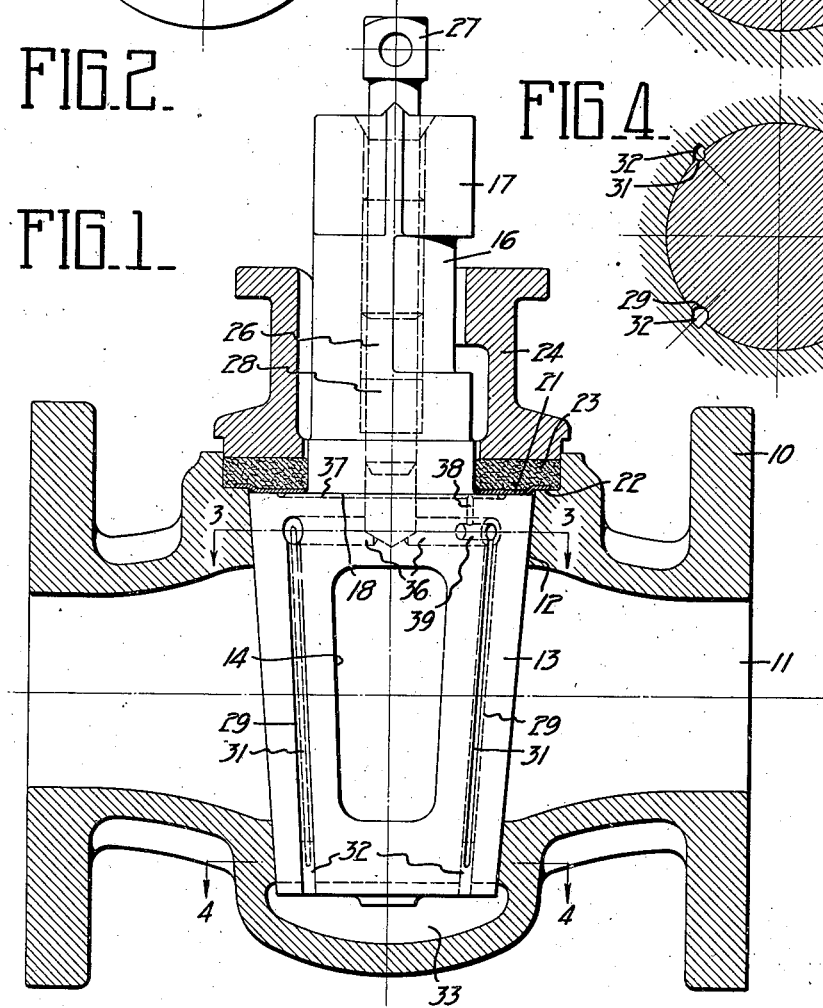
INVENTOR.
Sven J. Nordstrom
BY
White, Prost, Flehr & Lothrop
ATTORNEYS.

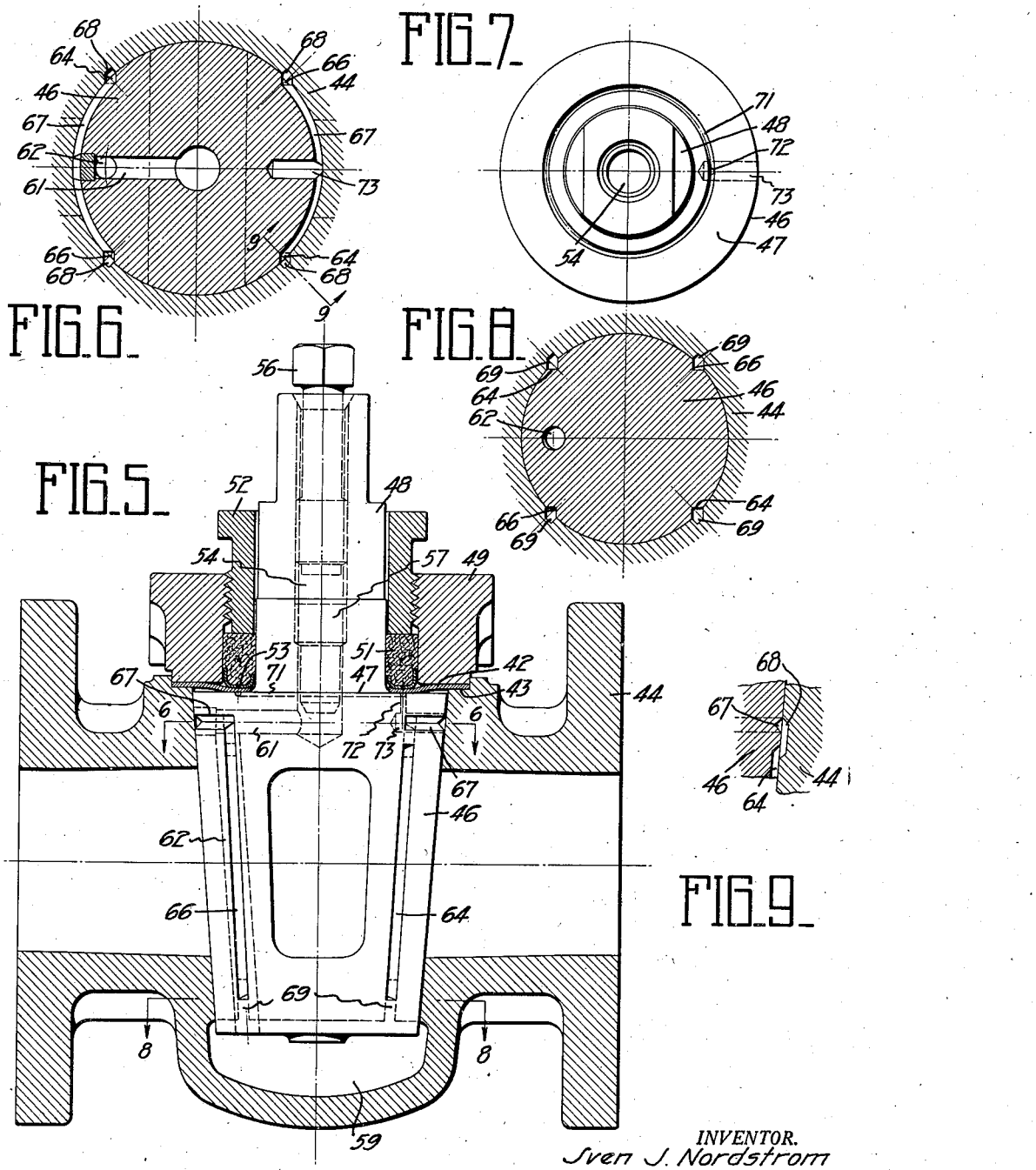

Patented Aug. 27, 1935

2,012,578

UNITED STATES PATENT OFFICE 2,012,578

VALVE

Sven Johan Nordstrom, Piedmont, Calif., assignor to Merco Nordstrom Valve Company, San Francisco, Calif., a corporation of Delaware Application June 8, 1931, Serial No. 542,887

16 Claims. (Cl. 251—93)

This invention relates generally to plug valves of the type having provision for applying viscous lubricant under pressure to certain parts thereof. It has particular application to such valves having tapered plugs, and which employ compressed lubricant to hydraulically jack the plug from its seat.

It is an object of the invention to generally improve upon plug valves of the above character, whereby lubrication and sealing thereof is made more effective and efficient.

It is a further object of the invention to devise novel and improved means for sealing a plug valve to prevent leakage of line fluid between the stem and casing. In this connection the invention is characterized by the use of a lubricant channel interrupting certain cooperating sealing surfaces, and which when used in connection with a lubricant seal plug valve is supplied with lubricant under pressure from the remainder of the lubricating system for the valve. By causing a lag in the pressure of lubricant applied to these cooperating sealing surfaces when the invention is incorporated in a lubricant lift plug valve there is no interference with proper jacking action of the plug by higher pressure developed in other parts of the lubricating system.

It is another object of the invention to devise a new arrangement or form of lubricant channels interrupting the valve working surfaces of a plug valve utilizing lubricant under pressure, whereby the advantages of sealed port lubrication can be secured without an undue washing away of the lubricant in certain channels which are exposed to the line pressure when the plug is turned between open and closed positions. Said new arrangement may be used alone or in conjunction with said stem sealing means.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Referring to the drawings:

Figure 1 is a side elevational view, partly in cross section, illustrating a valve incorporating the present invention.

Fig. 2 is a plan view of the plug incorporated in the valve of Fig. 1.

Fig. 3 is a cross sectional detail taken along the line 3—3 of Fig. 1.

Fig. 4 is a cross sectional detail taken along the line 4—4 of Fig. 1.

Fig. 5 is a view similar to Fig. 1, but illustrating a modified form of my invention.

Fig. 6 is a cross sectional detail taken along the line 6—6 of Fig. 5.

Fig. 7 is a plan detail illustrating the valve plug incorporated in the valve of Fig. 5.

Fig. 8 is a cross sectional detail taken along the line 8—8 of Fig. 5.

Fig. 9 is a cross sectional detail taken along the line 9—9 of Fig. 6.

Referring first to Figs. 1 to 4 inclusive, the valve illustrated therein consists of a casing 10 provided with a passageway 11 therethrough for flow of line fluid. The casing is also formed to provide tapered valve seat 12 extending transversely to the passageway 11. Rotatably disposed within the tapered valve seat 12 there is a tapered valve plug 13, provided with a port 14 adapted to register with passageway 11 for open position of the valve. To enable turning of the plug there is a stem 16 extending into the casing, preferably integral with and connected to the large end of the plug. The outer end portion 17 of stem 16 may be squared or otherwise formed to facilitate application of a handle or wrench. The large end of the plug forms an annular shoulder 18, the upper surface of which in this instance is in a plane at right angles to the axis of the plug. In manufacture the surface of shoulder 18 is made relatively smooth as by suitable machining or grinding methods.

Positioned adjacent shoulder 18 there is an abutting surface of the casing overhanging said shoulder of the plug, which in the preferred embodiment of the invention shown consists of a diaphragm 21, preferably made of relatively thin flexible sheet metal. The general plane of diaphragm 21 is parallel to the plane of the surface of shoulder 18, as the diaphragm is perforated to accommodate the inner end of stem 16. Since the diaphragm is generally circular in contour, it can be properly described as being a flexible metal washer. In order to seal the outer peripheral portion of diaphragm 21 with respect to casing 10, the casing is counterbored to provide an annular shoulder 22 upon which the outer periphery of the diaphragm is seated. In conjunction with and overlying diaphragm 21 there preferably is employed an annular ring 23 which offers considerable resiliency to compression, as for example a suitable fibrous packing material. Pressure is applied to the upper surface of ring 23 by means of a follower 24, this follower being retained in the valve casing by bolts or other suitable means. Application of pressure to the upper surface of packing ring 23 serves to press down the inner peripheral portion of diaphragm 21 into contact with the adjacent surface of shoulder 18, so that cooperating surfaces between the diaphragm and shoulder 18 are brought into contact over a substantial area which is annular and which surrounds the inner end of stem 16. These cooperating surfaces can be termed sealing surfaces, and are supplied with lubricant from the lubricating system of the valve as will be presently explained to prevent leakage of line fluid between the stem and the casing. Packing ring 23, by virtue of the thrust which it transmits to the large end of the plug thru diaphragm 21, in the preferred embodiment of the invention shown serves as means for yieldingly urging the plug into its seat. In manufacturing my valve the plane of the upper surface of shoulder 18 is generally slightly below the plane of shoulder 22, and therefore diaphragm 21 would be flexed downwardly a certain amount with respect to its outer peripheral portion, as shown in Fig. 1.

The lubricating system for my valve includes a bore 26 extending axially thru stem 16, and which is threaded to receive a lubricant pressure screw 27. A suitable check valve 28 is also positioned within bore 26 below the end of screw 27, to prevent back flow of lubricant. Bore 26 below screw 27 can be termed a primary lubricant chamber. Interrupting the valve working surfaces, certain lubricant channels are provided which are adapted to be supplied with lubricant under pressure from the chamber formed by bore 26. These channels include channels 29 and 31 formed in the periphery of the valve plug 13, and extending longitudinally of the axis of the plug. They are spaced about the periphery of the plug as illustrated in Fig. 4. Branch lubricant channels 32 are formed in the lower portion of the valve seat, and communicate with a lubricant chamber 33 formed within the casing at the small end of the valve plug. The lower ends of longitudinal channels 29 may communicate with chamber 33, while the lower ends of channels 31 terminate short of the lower end of the plug and may be in communication with chamber 33 only when in registry with certain branch channels 32. As shown in Fig. 3, radial ducts 36 are formed in the large end of the plug, and these ducts communicate at their inner ends with the lower end of bore 26, and at their outer ends with the upper ends of the longitudinal channels 29. Therefore lubricant under pressure in bore 26 below the pressure screw 27, is free to flow downwardly thru longitudinal channels 29, into the lubricant chamber 33. However, it will be understood that the lubricant grooves 29, 31, 32 in the seating surface of the plug and casing do not necessarily communicate with the chamber 33.

Formed within the face of shoulder 18, as shown in Fig. 2, there is a circular lubricant channel or groove 37. This channel is arranged so as to be intermediate the area of contact between the diaphragm 21 and shoulder 18, that is intermediate the sealing surfaces afforded by these parts. In order to establish communication between circular channel 37 and the remainder of the lubricant system, the large end of the plug is provided with ducts 38 and 39, duct 38 leading downwardly from circular channel 37, and duct 39 leading radially from the lower end of duct 38 to the valve working surfaces and to the upper ends of longitudinal channels 31.

Operation of the valve shown in Figures 1 to 4 can be briefly outlined as follows:—Assuming that bore 26 below screw 27, and chamber 33, have been filled with viscous lubricant under pressure, and that the valve plug is in closed position as illustrated, application of pressure to the lubricant by turning down screw 27 causes lubricant to flow outwardly thru ducts 36, and then downwardly thru longitudinal channels 29 to chamber 33. From chamber 33 lubricant can flow upwardly thru the branch channels 32 in communication with longitudinal channels 31, and thence upwardly thru these longitudinal channels. From the upper end of one longitudinal channel 31 lubricant can flow thru ducts 38 and 39 into the circular channel 37. Application of viscous lubricant to the cooperating surfaces between diaphragm 21 and shoulder 18 serves to seal these surfaces against leakage of line fluid. If a sufficiently high lubricant pressure is applied to chamber 33, the plug will be hydraulically jacked from its seat, at which time lubricant will be effectively smeared over the valve working surfaces from the longitudinal channels 29 and 31 and also from the lubricant chamber 33. Because of the relatively small dimensions of longitudinal channels 31, as compared to channels 29, these channels 31 offer considerable resistance to the flow of lubricant thru the same, and therefore the pressure of lubricant applied to channel 37 lags behind that in chamber 33. Considerable additional pressure lag can be effected by making duct 38 of small cross section as illustrated in Fig. 1. The object to be gained in greatly reducing the lubricant pressure applied to channel 37, is to prevent interference with jacking action of the plug, at which time a relatively high pressure exists in chamber 33. By properly positioning channel 37, any extrusion of lubricant from between the cooperating surfaces can be caused to flow upwardly around the stem, between the stem and the packing ring 23.

The valve illustrated in Figs. 5 to 9 inclusive differs from the valve previously described, mainly in the arrangement of channels in the valve working surfaces. In this case the outer peripheral portion of diaphragm 42, corresponding to diaphragm 21 of Fig. 1, rests upon an annular shoulder 43 formed in the valve casing 44. The large end of valve plug 46 is likewise formed to provide an annular shoulder 47, surrounding the valve stem 48. A lower annular surface formed upon the packing member 49 engages the outer peripheral portion of the diaphragm 42 and clamps it down upon shoulder 43. To aid in effecting a proper seal, a suitable gasket can be disposed between the diaphragm and shoulder 43. Clamping member 49 is held in place by bolts or other suitable means. Clamping member 49 also has an opening concentric with stem 48, and within the space so formed between the stem and the clamping member, there is an annular packing 51 which is resilient to compression. A follower 52 is threaded into clamping member 49, and serves to apply pressure to the upper surface of packing 51. A washer 53, preferably made of sheet metal U-shaped in cross section, is interposed between the lower surface of packing 51 and the inner peripheral portion of diaphragm 42. By screwing down follower 52, sufficient yielding force is applied to the inner peripheral portion of diaphragm 42, to force this portion into engagement with shoulder 47 and thus hold the valve plug within its seat.

The lubricating system utilized in Figs. 5 to 9 inclusive consists of a bore 54 extending axially of stem 48, and which is threaded to receive the lubricant pressure screw 56. Positioned within the bore below the lower end of screw 56 there is a suitable check valve 57. Formed within the casing at the small end of the plug there is a lubricant chamber 59, which is in communication with bore 54, thru the radial duct 61 and longitudinal duct 62.

The lubricant channels formed in the valve working surfaces consist in this case of longitudinal channels 64 and 66 formed in the periphery of the valve plug 46. The upper peripheral portion of plug 46 is also provided with arcuate lubricant channels 67, while the upper portion of the valve seat is provided with short spaced channels 68 (Figs. 6 and 9). One end of each arcuate channel 67 communicates with the upper end of a corresponding longitudinal channel 66, but the other end of each arcuate channel 67 is out of communication with the upper end of the corresponding longitudinal channel 64. In other words the upper ends of longitudinal channels 64 terminate short of the corresponding ends of arcuate channels 67, but for open and closed positions are placed in communication therewith thru channels 68. Formed in the lower portion of the valve seat are branch lubricant channels 69 which communicate with lubricant chamber 59, and which also communicates with the lower ends of longitudinal channels 64 and 66 for certain positions of the valve plug. Formed in the upper face of shoulder 47, intermediate the area of contact between the shoulder and diaphragm 42, there is a circular channel or groove 71 (Fig. 7) corresponding to circular channel 37 of Fig. 2. In order to convey lubricant to this channel from the remainder of the lubricating system, connected lubricant ducts 72 and 73 are provided in the large end of the plug. Duct 72 communicates with circular channel 71, (Figs. 5 and 7) while duct 73 communicates with the adjacent arcuate channel 67 (Fig. 6).

In explaining the operation of the valve illustrated in Figs. 5 to 9 inclusive, it will be presumed that bore 54, ducts 61 and 62, and chamber 59, are filled with viscous lubricant. Upon application of pressure to this lubricant by turning down screw 56, and assuming that the valve plug is in closed position in which channels 64 and 66 are in communication with respective branch channels 69, lubricant is caused to flow upwardly from chamber 59, thru branch channel 69, and thru longitudinal channels 64 and 66. From the upper ends of longitudinal channels 64 and 66, lubricant also flows into arcuate channels 67. From one of the arcuate channels 67 lubricant is also applied thru ducts 72 and 73, to the circular channel 71. It will be noted that lubricant applied to lubricant channel 71 must flow thru a tortuous path, that is upwardly thru certain longitudinal channels 64 and 66, thru one of the arcuate channels 67, and then thru ducts 72 and 73. Therefore the pressure as finally applied to channel 71 lags behind the pressure in chamber 59 which is utilized to effect such flow. For this reason fluid pressure sufficient to jack the plug from its seat can be built up in chamber 59, without applying such fluid pressure to channel 71 as might interfere with such jacking action. Application of lubricant to channel 71 effectively seals the surfaces in contact between the diaphragm 42 and shoulder 47, so as to prevent leakage of line fluid between the casing and stem. In open position of the valve plug, the lower ends of longitudinal channels 64 and 66 are likewise in communication with branch channels 69 so that in this position application of pressure to the lubricant likewise results in application or replenishing of lubricant in channel 71. In turning the valve plug between open and closed positions, certain of the longitudinal channels 64 and 66 are exposed to line pressure. However in such positions these longitudinal channels are cut off from communication with chamber 59, so that no undue escape of lubricant results. The smearing of lubricant between the valve working surfaces from the lubricant channels interrupting the same serves to adequately seal the valve against leakage past the plug, while as has been previously mentioned lubrication of the surfaces in contact between the diaphragm 42 and shoulder 47 prevents leakage about the stem. Washing of lubricant from exposed longitudinal channels 64 and 66 when the valve is being turned between open and closed positions is greatly minimized by virtue of the fact that the channels are in the periphery of the plug rather than in the valve seat.

Subject matter disclosed but not claimed in the present case is claimed in my co-pending application Serial Number 541,218, filed June 1, 1931.

I claim:

1. In a plug valve, a valve casing, a rotatable valve plug disposed within the casing, a stem extending into the casing and connected to one end of the plug, said plug being formed to provide an annular shoulder adjacent the stem and concentric with the plug, a member sealed with respect to the casing and having a surface adapted to contact with the face of the shoulder, the area of contact being annular and concentric with the plug, a substantially annular lubricant channel interrupting said area of contact intermediate thereof, and means for supplying viscous lubricant under pressure to said channel.

2. In a plug valve, a valve casing having a passageway therethrough for flow of fluid and also having a tapered valve seat formed transversely of the passageway, a tapered plug rotatably disposed in said seat, a rotatable operating stem extending into the casing and operatively connected to the large end of the plug, said plug being formed to provide a shoulder at its large end surrounding the inner end of the stem, a member disposed adjacent said shoulder and sealed with respect to the casing, said member having an annular surface adapted to contact and cooperate with an annular surface afforded by said shoulder, and a pressure lubricant system for said valve, said pressure lubricant system including a chamber adapted to receive viscous lubricant under pressure, a lubricant channel substantially surrounding the inner end of the stem and interrupting said cooperating surfaces, and a lubricant duct serving to establish communication between said channel and said chamber.

3. In a valve, a valve casing having a passageway therethrough for flow of fluid and also having a tapered bore formed transversely of the passageway, a rotatable valve plug disposed within said seat, a rotatable stem extending into the casing and operatively connected to the large end of the plug, said plug being formed at its large end to provide an annular shoulder surrounding the inner end of the stem, a member disposed adjacent said shoulder and sealed with respect to the casing, said member having an annular surface surrounding the inner end of the stem which is adapted to contact and cooperate with an annular surface afforded by said shoulder, and a pressure lubricant system for said valve, said system including a lubricant chamber adapted to receive viscous lubricant under pressure, a lubricant channel interrupting said cooperating surfaces and adapted to substantially surround the inner end of the stem, a fluid pressure attenuating lubricant duct communicating between said channel and said chamber, and lubricant channels interrupting the valve working surfaces and likewise adapted to be in communication with said lubricant chamber.

4. In a valve, a valve casing having a fluid passageway therethrough for flow of fluid and also having a tapered bore formed transversely of the passageway, a tapered valve plug rotatably disposed in said seat, a rotatable stem extending into the casing and operatively connected to the large end of the plug, said plug being formed to provide at its large end an annular shoulder surrounding the inner end of the stem, a member disposed adjacent said shoulder and sealed with respect to the casing, said member providing an annular surface surrounding the inner end of the stem which is adapted to contact and cooperate with an annular surface afforded by said shoulder, and a pressure lubricant system for said valve, said system including a lubricant channel arranged to substantially surround the inner end of the stem and to interrupt said cooperating surfaces, a lubricant chamber formed within the casing at the small end of the plug and adapted to receive lubricant under pressure to effect hydraulic jacking of the plug with respect to its seat, lubricant channels interrupting the valve working surfaces and in communication with said chamber, said channels being arranged to afford a sealed port effect when the plug is in closed position, and a lubricant duct communicating between said first mentioned channel and the remainder of the lubricant system whereby lubricant is supplied to said first named channel at a fluid pressure greatly reduced compared to the pressure of lubricant which may be applied to said chamber.

5. In a plug valve, a valve casing having a passageway therethrough for flow of fluid and also having a tapered valve seat formed transversely of the passageway, a valve plug, the large end of the plug being formed to provide an annular shoulder surrounding the inner end of the stem, a diaphragm arranged adjacent said shoulder and having its outer peripheral portion sealed with respect to the casing, the inner peripheral portion of said diaphragm overlying said annular shoulder, means for yieldingly urging the inner peripheral portion of said diaphragm into contact with said shoulder, whereby the plug is yieldingly urged into its seat, and a pressure lubricant system for said valve, said system including a chamber adapted to receive viscous lubricant under pressure, a lubricant channel arranged to interrupt the cooperating surfaces in contact between the annular shoulder and said diaphragm, said channel also substantially surrounding the inner end of the stem, and a lubricant duct serving to establish communication between said channel and said chamber.

6. In a valve, a valve casing having a passageway therethrough for flow of fluid and also having a tapered seat formed transversely of the passageway, a tapered valve plug rotatably disposed in said seat, a rotatable stem extending into the casing and operatively connected to the large end of the plug, said plug being formed to provide an annular shoulder at its large end surrounding the inner end of the stem, a flexible metallic diaphragm disposed adjacent said shoulder, said diaphragm being apertured to accommodate the inner end of the stem and having its outer peripheral portion sealed with respect to the casing, means for yieldingly urging the inner peripheral portion of said diaphragm into contact with said annular shoulder, the cooperating surface thus brought into engagement surrounding the inner end of the stem, and a pressure lubricant system for said valve, said pressure lubricant system including a chamber adapted to receive viscous lubricant under pressure, a circular lubricant channel intermediate said cooperating surfaces, and a fluid pressure attenuating duct serving to establish communication between said channel and said chamber.

7. In a valve, a valve casing having a passageway therethrough for flow of fluid and also having a tapered valve seat formed transversely of the passageway, a tapered valve plug rotatably disposed in said seat, a rotatable stem extending into the casing and operatively connected with the large end of the plug, said plug being formed to provide an annular shoulder at its large end surrounding the inner end of the stem, a flexible metallic diaphragm disposed adjacent said shoulder, said diaphragm being apertured to accommodate the inner end of the stem and having its outer peripheral portion sealed with respect to the casing, yielding means for urging the inner peripheral portion of the diaphragm into engagement with said annular shoulder, whereby the surfaces thus brought into contact surround the inner end of the stem, a channel arranged to interrupt the contact between said diaphragm and said shoulder and a pressure lubricant system for said valve, said pressure lubricant system including a chamber adapted to receive viscous lubricant under pressure, and a duct formed in part by a channel interrupting the valve working surfaces and serving to supply lubricant from said chamber to the valve working surfaces and also to said first named channel.

8. In a valve, a valve casing having a fluid passageway therethrough and also having a tapered valve seat formed transversely of the passageway, a tapered valve plug disposed in said seat, a rotatable stem extending into the casing and operatively connected to the large end of the plug, said plug being formed to provide an annular shoulder at its large end surrounding the inner end of the stem, a flexible metallic diaphragm disposed adjacent said shoulder, said diaphragm being apertured to accommodate the inner end of the stem and also being sealed with respect to the casing along its outer peripheral portion, yielding means acting between the casing and the inner peripheral portion of the diaphragm for urging said inner peripheral portion into contact with said annular shoulder, whereby the cooperating surfaces thus brought into contact between the diaphragm and said shoulder surround the inner end of the stem, and a pressure lubricating system for said valve, said system including lubricant channels interrupting the valve working surfaces, a circular lubricant channel interrupting said cooperating surfaces and intermediate thereof a lubricant chamber formed at the small end of the plug whereby upon introduction of lubricant into said chamber under sufficient pressure the plug is jacked from its seat, and a common source of lubricant in communication with said channels interrupting the valve working surfaces, said circular channel, and said lubricant chamber, the communication between said source and said circular channel being such that the pressure of lubricant applied to the same is substantially less than the pressure of lubricant supplied to said chamber to effect jacking of the valve.

9. In a plug valve, a valve casing, a rotatable valve plug disposed within the casing, one end of said plug within the casing being formed to provide an annular shoulder concentric with respect to the plug, a member sealed with respect to the casing and having a surface adapted to contact with the face of the shoulder, the area of contact being annular and concentric with respect to the plug, a circular lubricating channel interrupting said area of contact and intermediate thereof, and means for supplying viscous lubricant under pressure to said channel.

10. In a plug valve, a valve casing, a tapered rotatable valve plug disposed within the casing, the large end of said plug being formed to provide an annular shoulder within the casing and concentric with respect to the plug, a flexible diaphragm having its outer peripheral portion sealed with respect to the casing and having a surface adapted to contact with the face of the shoulder, resilient means for urging said surface of said diaphragm into contact with the face of the shoulder, the area of contact being annular and concentric with respect to the plug, a circular lubricant channel interrupting said area of contact and intermediate thereof, and means for supplying viscous lubricant under pressure to said channel.

11. In a plug valve, a valve casing, a rotatable valve plug disposed within the casing, one end of the plug within the casing being formed to provide an annular shoulder, an abutting surface overhanging said shoulder and adapted to contact with the face thereof in a substantially annular area, and a substantially annular lubricating groove interrupting said area of contact, and means for supplying lubricant under pressure to said groove.

12. In a plug valve, a valve casing, a rotatable valve plug disposed within the casing, one end of the plug within the casing being formed to provide an annular shoulder, an abutting surface overhanging said shoulder and adapted to contact with the face thereof in a substantially annular area, means for urging said surface and shoulder together, a substantially annular intermediate lubricating groove interrupting said area of contact, and means for supplying lubricant under pressure to said groove.

13. In a plug valve, a valve casing having a passageway therethrough for flow of fluid, a rotatable valve plug disposed within said casing and having a hole adapted to register with the passageway when the plug is in open position, one end of said plug within the casing being formed to provide an annular shoulder, an abutting surface overhanging said shoulder and adapted to contact with the face thereof in a substantially annular area, a lubricant groove system substantially surrounding at least one of said passages in one position of the valve plug, a substantially annular intermediate lubricating groove interrupting said area of contact, and means for supplying lubricant under pressure to said annular groove and said lubricant groove system.

14. In a plug valve, a valve casing having a passageway therethrough for flow of fluid, a rotatable valve plug disposed within said casing and having a hole adapted to register with the passageway when the plug is in open position, one end of said plug within the casing being formed to provide an annular shoulder, an abutting surface overhanging said shoulder and adapted to contact with the face thereof in a substantially annular area, means for urging said surface and shoulder together, a lubricant groove system substantially surrounding at least one of said passages in one position of the valve plug, a substantially annular intermediate lubricant groove interrupting said area of contact, and means for supplying lubricant under pressure to said annular groove and said lubricant groove system.

15. In a plug valve, a valve casing, a rotatable valve member within the casing, an operating member extending into the casing for operating said valve member, one of said members being formed to provide an annular shoulder, an abutting surface overhanging said shoulder and adapted to contact therewith, a substantially annular lubricant groove interrupting said area of contact, and means for supplying lubricant under pressure to said groove.

16. In a plug valve, a valve casing, a rotatable valve member within the casing, an operating member extending into the casing for operating said valve member, one of said members being formed to provide an annular shoulder, an abutting surface overhanging said shoulder and adapted to contact therewith, resilient means for urging together said surface and shoulder, a substantially annular lubricant groove interrupting said area of contact, and means for supplying lubricant under pressure to said groove.

SVEN JOHAN NORDSTROM.